United States Patent [19]
Hayek et al.

[11] 3,948,668
[45] Apr. 6, 1976

[54] FLUOROCARBON-CONTAINING PRINTING INK AND PROCESS FOR IMAGE PRINTING
[75] Inventors: Mason Hayek; Richard J. Moody, both of Wilmington, Del.
[73] Assignee: E. I. Du Pont de Nemours and Company, Wilmington, Del.
[22] Filed: Mar. 15, 1974
[21] Appl. No.: 451,503

[52] U.S. Cl. ............... 106/22; 106/23; 106/26; 106/27; 106/28; 106/29; 106/32
[51] Int. Cl.² ......................... C09D 11/00
[58] Field of Search ....... 106/20, 22, 23, 26, 27–29, 106/32; 260/29.6 F, 648 F

[56] References Cited
UNITED STATES PATENTS

| | | | |
|---|---|---|---|
| 2,809,990 | 10/1957 | Brown | 106/32 |
| 3,085,912 | 4/1963 | Friese | 106/20 |
| 3,283,012 | 11/1966 | Day | 260/633 |
| 3,681,105 | 8/1972 | Milutin et al. | 117/15 |
| 3,773,538 | 11/1973 | Milutin et al. | 117/15 |

FOREIGN PATENTS OR APPLICATIONS 1,264,681  2/1972  United Kingdom

Primary Examiner—Lorenzo B. Hayes
Attorney, Agent, or Firm—James A. Costello

[57] ABSTRACT

An image-printing process comprising applying to a substrate a printing ink containing from about 0.01% to 1.0%, based on the total weight of the ink, of a fluorocarbon surfactant containing a fluorocarbon moiety selected from the group.

$CF_3(CF_2)_3$, $CF_3CF(CF_3)O-$, and $CF_3CF(CF_3)CF_2-$, the surfactant containing at least 25% fluorine by weight; also, printing inks containing particular surfactants having the $CF_3(CF_2)_3$ moiety.

1 Claim, No Drawings

FLUOROCARBON-CONTAINING PRINTING INK AND PROCESS FOR IMAGE PRINTING

BACKGROUND OF THE INVENTION

1. Field of the Invention

This invention concerns image-printing or imaging, i.e. printing letters, characters, figures (patterns) on a substrate. More specifically the invention concerns an improved process for image-printing and certain improved printing inks that contain particular fluorocarbon surfactants having the $CF_3(cf_2)_3$ moiety.

2. Description of the Prior Art or

The art of printing has been defined as the act, art, or practice of impressing letters, characters, of figures (patterns) on a substrate, and can be termed more particularly as "imaging." Imaging demands a precision of transfer from printing plate to substrate not required when, say, a continuous coating is applied by printing or an application of coloring agent is made by brush or roller.

Printing inks are composed basically of two parts, a dye or pigment coloring agent which forms the record of print or other image pattern left on the substrate, and a vehicle which aids in transfer of the coloring agent. Printing inks are commonly divided into three main classes; typographic, planographic and intaglio, corresponding to the three major divisions of printing. Each of these three different classes of inks has properties different from the other two.

Recently, a process has been developed for coating the inactive side of pressure-sensitive adhesive tape with an ink containing a fluorocarbon surfactant. The tape can be converted to rolls, where the fluoro compound helps to keep the inactive side of the tape from sticking to the side bearing the adhesive. This adhesive tape-coating process is quite readily distinguished from the image-printing process of the instant invention. The ink employed in the tape-coating process is also clearly distinguishable from the inks of the instant invention which contain significantly different fluorocarbon surfactants therein.

The particular printing processes that are improved according to the teachings of this invention are as follows. The improved inks of this invention are those that are usually employed in such printing processes with the improvement being the incorporation therein of the particular fluorocarbon surfactants described with particularity hereafter.

Typographic Printing

Typographic inks are used to print from raised surfaces, such as ordinary type, line and halftone cuts. These inks usually consist of pigments ground in a vehicle or varnish of linseed oil or of synthetic resins dispersed in drying oils. They most often dry by oxidation of the vehicle although heat drying is employed in some cases. Clean transfer of ink from type to substrate and absence of ink-caused erosion of metal type and press machinery are important in typographic ink technology.

Planographic Printing

Planographic inks are used to print from plane surfaces, as in lithographic and offset processes. Their compositions can vary quite widely, as from the thin ink used for newsprint to the rather thick lithographic inks. Planographic inks are normally anhydrous and are usually water repellent. Coloring agents for planographic inks should be relatively soft and must be very finely divided. It is very important that all of the pigment be wetted by the vehicle and thoroughly dispersed therein.

Intaglio Printing

Intaglio inks are used to print from engraved, or depressed, surfaces. They include gravure and rotogravure inks and flexographic inks, all of which are transported in and out of minute depressions in metal rolls during the course of the printing process. Both anhydrous and water based inks are included in this broad class.

Rotogravure inks in addition to pigments, generally employ solvent solutions comprising a resin, a plasticizing agent, a wax and the solvent, which may be a mixed solvent. The resin, which forms a part of the printed matter, has several functions. It may help in causing the print to adhere to the printed surface. It must be chosen carefully, with knowledge of the ultimate use of the ink and of the properties of the other ink components in mind. The resin should be soluble in the solvent component of the vehicle. It should provide, for example, gloss, water resistance, or other desired properties to the printed matter. It functions also to bind the pigment and other ingredients to each other and to the substrate. Plasticizers generally improve ink film flexibility and aid adhesion. Waxes are added to improve scuff resistance.

In gravure printing the ink is applied to a gravure plate which holds the ink in small indentations in the surface of the plate. When the gravure plate is then applied to the surface to be printed, the ink is drawn to the substrate and quickly dries thereon.

Among the problems or shortcomings faced in the gravure printing process, are: (1) A tendency for the ink to remain in the plate instead of transferring readily to the substrate; (2) A mottled appearance of the printed material, indicating a discontinuity of the ink deposit; (3) Erosive degradation of the surface of the gravure roll, changing and distorting the printed matter derived therefrom; (4) Excessive solvent consumption due to evaporation of liquid medium from the ink supply fountain; and (5) Nonuniformity in quality of the printed copy due to changes in ink viscosity and pigment concentration as solvent evaporates and is replenished.

Many flexographic inks have a character and composition similar to those of gravure inks. These inks are transferred during the printing process from a roller to a printing plate by way of small cells in the roller, a function resembling that of the small indentations in a gravure printing plate.

SUMMARY OF THE INVENTION

This invention concerns an improvement in an image-printing process of applying a printing ink to a substrate to be printed, the improvement comprising applying a printing ink containing from about 0.01% to 1.0%, based on the total weight of the ink, of a fluorocarbon surfactant containing a fluorocarbon moiety selected from the group $CF_3(CF_2)_3$, $CF_3CF(CF_3)O-$, and $CF_3CF(CF_3)CF_2-$, the surfactant containing at least 25% fluorine by weight, the balance of the fluorocarbon surfactant containing a moiety that facilitates solubility in the printing ink. Of course, the surfactant itself is soluble in the ink.

By "moiety that facilitates solubility" is meant that the overall surfactant solubility is attributable to this (solubilizing) moiety.

This invention also concerns an improved printing ink comprising a coloring agent, a liquid vehicle, and a surfactant, the improvement comprising incorporation therein, as the surfactant, from about 0.01% to 1.0%, based on total weight, of a fluorocarbon selected from the group i. $F(CF_2)_nCH_2CH_2SCH_2CH_2N^+R_1R_2R_3$ wherein $n$ is an integer of from 4 to 14, $R_1$ is an alkyl group of 1 to 4 carbon atoms,
$R_2$ is an alkyl group of 1 to 4 carbon atoms, and
$R_3$ is an alkyl group of 1 to 4 carbon atoms or is the covalently bonded counterion $-(CH_2)_qSO_3^-$ or $-(CH_2)_mCOO^-$ wherein $q$ is an integer of from 2 to 4, and $m$ is an integer of from 1 to 3, and ii $F(CF_2)_n(CH_2)_mO(CH_2CH_2O)_pH$ wherein $n$ is from 4 to 14, $m$ is 1 to 14 and $p$ is 1 to 20.

It should be understood that the fluorocarbon of i) above is associated with a solubilizing counterion. The contemplated counterions are as specifically set out (covalently bonded) or, the counterions can be other known moieties that will readily occur to those skilled in the art such as, for example, a chloride, iodide, acetate or similar anion.

DETAILS OF THE INVENTION

The types of printing to which the process of this invention applies and in which the ink compositions of this invention can be employed, are as follows.

Typographic Printing

As will be readily appreciated by those skilled in the art, the inks employed in such printing are generally anhydrous, and comprise linseed oil varnishes, pigment, and dryers. wax, mineral oil, resin, grease and special varnishes are used in inks for the various kinds of presses. Ink character and ingredients must also be adjusted for the substrate being printed. For absorbent paper little or no drier is required. Where printed surfaces are stacked, wax can be used to prevent the adjacent surfaces from sticking together. The inks are made either by mixing predispersed finely ground pigments with solvents, varnishes, etc., or by mixing dry pigment with vehicles and grinding in ink mills. Letterpress inks employing flushed pigments and containing a fluorocarbon surfactant as taught herein have improved tinctorial strength and gloss.

Planographic Printing

Planographic inks are mainly used in lithographic and offset painting processes and are greasy and water-repellent in nature. They are usually composed of a mixture of linseed oil varnishes with a pigment, a dryer and often additional grease and/or wax. The pigment must be very finely divided, since a very thin volume of ink is carried by the printing plates. For the same reason it must be very thoroughly dispersed. In making planographic inks, the vehicle dispersant and coloring agent are usually mixed and ground together and then the other ingredients, including fluorocarbon surfactants are added.

A typical offset ink contains about 40% linseed oil varnish, usually a mixture, 40% pigment and the remainder dryers. The dryers are mainly oxidation catalysts such as cobalt or manganese soaps.

Intaglio Printing

The inks employed in gravure and flexographic printing processes have relatively low viscosity and almost always dry by evaporation of the solvent component. The quality of the images obtained during gravure and flexographic printing processes is distinctly improved when a fluorocarbon surfactant as described is included in the ink employed. The fluorocarbon surfactant can be added to the ink at any time before it is used. It can be used during the pigment grinding process, contributing to the ease and speed of this operation. The effectiveness of the additive persists through the printing process.

Among the ink solvents useful in gravure inks which are also satisfactory solvents for many fluorosurfactants are $C_1$ to $C_4$ alcohols, $C_6$-$C_8$ aliphatic hydrocarbons, toluene, xylene, the acetates of $C_1$ to $C_5$ alcohols, glycol ethers boiling from about 115° to 180°C., $C_1$ to $C_5$ aliphatic ketones and cyclohexanone.

Common resins used include ethyl cellulose, nitrocellulose, polyamides, chlorinated rubber, shellac, casein and various other natural and synthetic resins. Plasticizers and waxes are often included in the formulations.

Flexographic inks can have organic solvents as liquid vehicles, or, they can employ water either as part of the vehicle or alone, without organic solvent. The common flexographic solvents include ethanol, isopropanol, n-propanol, propyl acetate, petroleum naphtha, lactol spirits and similar low boiling organic solvents. Mixed water and organic solvent-based flexographic inks generally employ alcohols, glycols, or glycol ethers as solvents with water. Water-based flexographic inks usually contain ammonia or another volatile amine to solubilize resin used in the vehicle.

Both organic and inorganic coloring agents can be used in the various types of printing inks to afford the desired durable deposit on the substrate. Pigment coloring agents are usually dispersed by milling, often in the presence of the same liquid medium used in the ink. Sand milling, roller milling and other methods can be employed to disperse and mix pigment and resin. Carbon black, titanium dioxide, phthalocyanine blue, phthalocyanine green, chrome yellows, and naphthol reds exemplify pigments used in inks.

Gravure inks are classified by a letter system which is universally used in the printing trade. Originally designed to identify the solvents used, the system now designates the general binder system also. A, B, C, D, E, T, W and X are the common designations. The character of the various classes is indicated in the Table.

TABLE

| | | GRAVURE INK CLASSES | |
|---|---|---|---|
| Type | Resin or Binder Used | Solvents Used | Applications |
| A | metallated resins, gilsonite, and other hydrocarbon solvent resins | low-cost aliphatic hydrocarbons such as hexane, textile spirits, lactol spirits, VM&P, naphtha, mineral spirits | newspaper supplement, catalog preprint, and similar publication printing |
| B | ethylcellulose plus other | 50% aromatic hydrocarbon | same as above except |

TABLE-continued

GRAVURE INK CLASSES

| Type | Resin or Binder Used | Solvents Used | Applications |
|---|---|---|---|
| | modifying resins | solvent 50% aliphatic hydrocarbon solvent | designed for better performance on coated stock |
| C | nitrocellulose modified with resins and plasticizers | esters, ketones usually extended with aromatic hydrocarbon solvent diluents such as toluene, xylene | for printing on all papers, films, foils, and paperboard including nitrocellulose-coated cellophane, glassine, acetate, metallized paper, etc. |
| D | polyamides | usually a 50/50 blend of alcohol and aliphatic or aromatic hydrocarbon solvent | printing on foil, paper, boards, polymer-coated cellophane, polyethylene, polyester, and other specialty films. Also for hard, tough, glossy, overlacquer application |
| E | nitrocellulose or ethylcellulose plus alcohol-soluble resin modifiers and plasticizers | ethanol or other alcohols plus ester solvents such as ethyl acetate | dye inks and pigmented inks for stocks described under type C |
| T | chlorinated rubber plus other modifying resins and plasticizers | usually aromatic hydrocarbon solvent such as toluene or xylene | for nitrocellulose-coated cellophane, foil, paper and board for labels, wrappers, and cartons; also glossy overlacquers |
| W | natural or synthetic resins such as shellac, casein, maleated resins, etc. | water plus alcohols when required; ammonia or other | for absorbent stocks such as liner board, wallpaper, gift wrap, laminating inks, board to be waxed, etc. |
| X | any other nonrecognized type required | alkali used also for solubilization of binder | all other miscellaneous applications |

A typical gravure ink can contain about 25% resin, 5% plasticizer, 20% pigment, 50% solvent and a small amount (0.5%) wax. The inks can be prepared by mixing the ingredients in a mixer, then milling the composition to ensure the proper degree of fineness. The pigment can be purchased in a fine state or premilled to a fine state of division before it is added to the ink composition. Commonly, inks are prepared in concentrate form and diluted to the desired viscosity with solvent at point of use.

Fluorocarbon surfactants can be added to the ink at any point during its preparation. It is convenient, however, to add the fluorocarbon surfactants when the ink is prepared for use, where the amount used in relation to the other ink ingredients can be accurately determined.

Fluorocarbon Surfactants

Fluorocarbon surfactants that are useful in the process of this invention can be either water-soluble or organic-soluble, and some have appreciable solubility in both water and organic solvents. They can be used, therefore, in both aqueous and nonaqueous systems. A fluorocarbon surfactant is broadly defined as a molecule, one end (moiety) of which is a solubilizing functional group while the other end (moiety) consists of a perfluorocarbon group containing a minimum of three carbon atoms and terminated by a $-CF_3$ group.

Many fluorocarbon surfactants have been disclosed in the prior art including representatives of anionic, cationic, amphoteric and nonionic classes. While the broad definition given above requires only a perfluorinated moiety and a solubilizing moiety, many fluorocarbon surfactants contain an intervening segment which can contribute to aqueous or nonaqueous solubility or may lend other desirable properties to the compounds. Thus, $C_7F_{15}COOH$ and $C_8F_{17}SO_3H$ are surfactants under the definition and so also are $C_7F_{15}CH_2CH_2COOH$ and $C_8F_{17}SO_2N(CH_3)CH_2COOH$.

Other intervening segments can consist of a sulfur or oxygen atom. The fluorinated segment of the fluorocarbon surfactant will generally contain from 3 to 14 carbon atoms. The expression $R_f$ in the following formulas represents a perfluorinated alkyl of 4 to 14 carbon atoms. The solubilizing part of the molecule can be an anion or a cation or can be nonionic, for example, a hydroxyl or ether group. Where it exists, the intervening segment may vary from 1 to about 16 atoms, most of which will normally be carbon atoms. Following are given some examples of known fluorocarbon surfactants preparable by known means.

$R_fCOOH$, $R_fSO_3H$, $R_fCONH(CH_2)_nN(CH_3)_2 \cdot HX$ where n is 2 to 6, and X is halogen;

$[R_fSO_2N(R)R'O]_m{}^0PX_{3-m}$ where R is hydrogen or alkyl of 1 to 12 carbons, R' is an alkylene bridging group of 2 to 12 carbons, m is an integer of 1 to 3 and X is chlorine, hydroxyl, amino, alkoxy or aralkoxy;

$R_fSO_2N(R')RCOOH$ where R is an alkylene bridging group of 1 to 18 carbon atoms and R' is a hydrogen atom or an alkyl group of 1 to 6 carbons;

$R_fSO_2N(R_1)-R_2CH_2OCH_2X$ where $R_1$ is H or a 1 to 6 carbon alkyl group, $R_2$ is a 1 to 12 carbon alkylene group and X is Cl or Br, and also quaternary ammonium salts of these compounds, $R_fSO_2N(R_1)-R_2CH_2OCH_2Q^+X^-$ where Q is trialkylamino of up to 36 carbons, dialkylamino of up to 8 carbons, pyridino, picolino, lutidino or quinilino, and $R_1$ and $R_2$ are as in the preceding example;

$R_fCH_2CH_2SCH_2CH_2CO_2Li$;

-continued

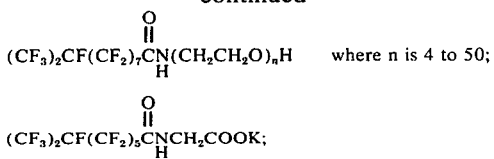 where n is 4 to 50;

$$(CF_3)_2CF(CF_2)_5CNCH_2COOK;$$
     (with O above C, H below N)

$CF_3CF(CF_3)O(CF_2)_x(CH_2)_yOCH_2Q^+A^-$, where $x$ and $y$ are integers of 1 to 20, Q is a positively charged residue of a nitrogen-containing quaternizing agent, and A is an accompanying anionic moiety;

$R_f$-$R_1CONHCH_2Q^+X^-$ where $R_1$ is -$(CH_2)_n$- or -$CH_2CHCl(CH_2)_m$- where $n$ is 3 to 12, $m$ is 1 to 10, X is Cl or Br and Q is as defined immediately above;

$R_fSO_2NR_1(CH_2)_mCONHCH_2Q^+X^-$ where $R_1$ is H or a 1 to 6 carbon alkyl, m is 2 to 12, X is Cl or Br and Q is trialkylamino of 3 to 36 carbons, tricycloalkylamino of about 18 carbons, arylamino of about 8 carbons, aralkylamino of about 8 carbons, pyridino, picolino, lutidino or quinilino;

$R_fSO_2NH(CH_2)_nNR_1R_2$ and quaternaries therefrom where $n$ is 2 to 6 and $R_1$ and $R_2$ are $C_{1\ to\ 6}$ alkyl groups;

$R_fCONH(CH_2)_nN^+R_2(R_1)(R_3)A^-$ where $n$ is 2 to 6, A is an anion, $R_1$ and $R_2$ are $C_{1\ to\ 6}$ alkyl groups and $R_3$ is a $C_{1-12}$ oleophilic hydrocarbon group;

$[R_fCH_2CH_2NR'R''R''']^+X^-$ where X is a solubilizing anion, R' is alkyl of 1 to 8 carbons, and R'' and R''' are alkyl of 1 to 8 carbons, cycloalkyl of 5 to 10 carbons; alkenyl of 3 to 8 carbons or cycloalkenyl of 4 to 9 carbons;

$R_fROCH_2Q^+X^-$ where Q is a tertiary nitrogenous residue, X is Cl or Br and R is -$CH_2$-$CHCl$-$(CH_2)_n$ or -$(CH_2)_m$- where $n$ is 1 to 10 and $m$ is 3 to 12;

$[R_fCON(R)-R'-O]_yPO(OH)_{3-y}$ where R is H or alkyl of 1 to 6 carbons, R' is alkylene of 2 to 12 carbons and $y$ is an average number of 1.5 to 2.5;

$[F(CF_2)_nCH_2CH_2O]_mP(O)(ONH_4)_{3-m}$ where n is a mixture of even integers from 4 to 14 and $m$ is 1 or 2;

$[R_fCH_2O]_yPO(OH)_{3-y}$ where $y$ is 1 or 2;

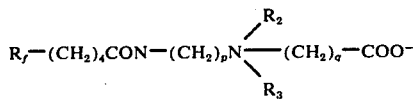

where $R_2$ and $R_3$ are 1 to 3 carbon alkyl and $p$ and $q$ can be 1 to 9;

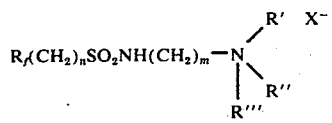

where $n$ is 1 to 10, $m$ is 2 to 6, R' and R'' are 1 to 6 carbon alkyl, and R''' is H, an alkyl or aralkyl group and X is an anion;

$R_f(CH_2)_nO(CH_2)_mCOOH$ where $n$ is 2 to 14 and $m$ is 2 to 5;

-continued

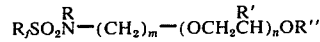

where R is H or lower alkyl (1 to 6 carbon), m is 2 or 3, R' is H or $CH_3$, n is 2 to 20, and R'' is H, $CH_3$ or $C_2H_5$.

The preferred fluorocarbon surfactants are not included in the list of known surfactants set out above. They are derived from the fluoroalcohol $F(CF_2)_nCH_2CH_2OH$ where n is an integer of 4 to 14, and have the formula $F(CF_2)_n(CH_2)_mO(CH_2CH_2O)_pH$ where n is from 4 to 14, m is 1 to 14 and p is 1 to 20. Of this group the most preferred is the composition where n is a mixture of even integers from 4 to 14 and at least 60% of the n's are 4 and 6, m is 2, and p is an average number from 9 to 12.

These preferred fluorocarbon surfactants possess both aqueous and organic solubility. They can be made by adding the desired amount of ethylene oxide to the fluoroalcohol, $F(CF_2)_nCH_2CH_2OH$, at 70° to 75°C. using a small amount of boron trifluoride as catalyst. Preparation of the fluoroalcohol is known. Addition of about 0.2% to 0.4% of one of these nonionic fluorocarbon surfactants to a gravure ink provides excellent printing results. See Example 1.

These benefits are also achieved by employing inks having the second preferred class of fluorocarbon surfactants: compounds containing a solubilizing counterion either covalently bonded as a part of, or associated with an ion of the formula $F(CF_2)_nCH_2CH_2SCH_2CH_2N^+R_1R_2R_3$ wherein n is an integer of from 4 to 14,
$R_1$ is an alkyl group of 1 to 4 carbon atoms,
$R_2$ is an alkyl group of 1 to 4 carbon atoms, and
$R_3$ is an alkyl group of 1 to 4 carbon atoms or is the covalently bonded counterion
-$(CH_2)_qSO_3^-$ or -$(CH_2)_mCOO^-$ wherein
q is an integer of from 2 to 4, and
m is an integer of from 1 to 3.

Such surfactants are made generally by the procedures of Preparations 3 and 5 wherein the making of representative members of the group is explained in detail.

Preparations 1 to 5 describe preparations of representative fluorocarbon surfactants that are useful in the process of this invention. Preparations 1, 3 and 5 are fluorocarbon surfactants employed in the improved printing ink formulations of this invention.

The Examples following the Preparations are meant to illustrate the invention. Therein, the amounts of fluorocarbon surfactants are described on the basis of 100% pure material. Of course, diluted amounts can be added to achieve the desired concentrations.

Preparation 1

A mixture of fluoroalcohol $C_nF_{2n+1}CH_2CH_2OH$ indicated by molecular weight determination to have an average composition represented by $C_7F_{15}CH_2CH_2OH$ was prepared (according to U.S. Pat. No. 3,283,012) from a mixture of perfluoroalkyl iodides. The perfluoroalkyl iodides comprised a mixture of $C_4$, $C_6$, $C_8$, $C_{10}$, $C_{12}$ and $C_{14}$ perfluoroalkyl iodides.

Then, 380 Grams of the fluoroalcohol was placed in a 4-neck reaction flask equipped with an agitator, thermometer, gas inlet tube and a condenser cooled with a dry ice-acetone mixture. The reaction flask was swept with dry nitrogen. The contents of the flask was then heated to 65° to 90°C. and boron trifluoride (0.62 ml) was added to the fluoroalcohol. Ethylene oxide gas was then introduced into the liquid fluoroalcohol via a gas inlet tube, maintaining the temperature at 65° to 90°C. After 10 hours, the total weight gain due to ethylene oxide was greater than 350 g.

The contents of the flask was then cooled to room temperature and transferred to distillation equipment. It was then heated to a temperature of 65° to 70°C. at 35–40 mm pressure in order to remove any unreacted ethylene oxide or 1,4-dioxane which may have formed from the ethylene oxide. The final net increase in weight of the remaining product was 350 g. which corresponded to an average of 10.6 units of ethylene oxide added per mole of the fluoroalcohol. Analysis of the fluorocarbon surfactant product by nuclear magnetic resonance confirmed that the product obtained was the ethylene oxide addition product of the fluoroalcohol represented by the formula $C_nF_{2n+1}CH_2CH_2O(CH_2CH_2O)_xH$ where $n$ has an average value of about 7 and $x$ has an average value of about 10.6.

Preparation 2

Into a suitable vessel was charged 12.0 parts of $F(CF_2)_nCH_2CH_2OH$ where n is a mixture of even integers from 4 to 14. The vessel was blanketed with nitrogen to exclude air, and the charge was heated to 60°C. Then 1.80 parts of phosphoric anhydride was sifted gradually into the charge over a period of about 45 minutes, while keeping the temperature below 65°C. When all of the phosphoric anhydride had been added, the charge was heated and stirred at 70°±5°C. for 20 hours. It was then cooled to 65°C. and 7.6 parts of isopropyl alcohol added.

After stirring for an hour at 55° to 60°C., 10.4 parts of water was added and the temperature adjusted again to 55° to 60°C. Then, 2.0 parts of 30% ammonium hydroxide was added gradually, keeping the temperature below 65°C. Sufficient ammonium hydroxide was added to make the charge alkaline, showing an orange spot on Brilliant Yellow test papers. The charge was held at 50° to 55°C. for another hour, then cooled to 30°C. and sampled to determine % solids content. The strength was adjusted to 35% solids by adding the required amount of water, and the product was ready to use. It is a 35% solution of the fluorocarbon surfactant, $[F(CF_2)_nCH_2CH_2O]_mPO(ONH_4)_{3-m}$, where $n$ is a mixture of even integers from 4 to 14 and $m$ is 1 or 2, averaging about 1½.

Preparation 3

A solution was prepared of 16 parts of sodium hydroxide in 104.6 parts of 95% ethyl alcohol, and to it was added a solution of 29.2 parts of 2-dimethylaminoethanethiol hydrochloride in 60.2 parts of 95% ethyl alcohol with stirring over a 10 minute period. The temperature of the mixture rose to 50°C. A precipitate formed as the solutions were mixed. The mixture was heated to reflux temperature for about 20 minutes, then cooled to room temperature. A sample turned Clayton Yellow test paper orange, indicating a pH of 11-12.

To the prepared mixture was added 105.6 parts of $F(CF_2)_nCH_2CH_2I$ where n is an even integer of from 4 to 14, and the $C_4$ component comprises less than 5%, the $C_6$ component comprises about 55–57%, the $C_8$ component about 27%, the $C_{10}$ component about 9% and $C_{12}$ and $C_{14}$ components together about 2.5%. Addition was made over 5 minutes, the temperature rising from 25°C. to 32°C. The charge was then heated to boiling and refluxed under a condenser for 15 hours, then cooled to room temperature and filtered. The liquid filtrate turned phenolphthalein test papers barely pink.

Next, 250 parts of water was added plus sufficient 30% aqueous sodium hydroxide solution to give a faint positive test on Clayton Yellow test paper. After stirring 15 minutes, the charge was allowed to stand until the aqueous and organic layers separated. The organic layer was removed and washed two times, each time with 100 parts of water, then dried at 50°C. and 1 millimeter of mercury pressure, absolute, to give 82 parts of amber colored liquid product of the formula, $F(CF_2)_nCH_2CH_2SCH_2CH_2N(CH_3)_2$.

In a suitable reactor 5.05 parts of the product was dissolved in 120 parts of absolute ethanol, and 0.95 part of chloroacetic acid was added to the solution. The charge was stirred and heated to reflux under a condenser, and 0.4 part of sodium hydroxide was added in the form of 5% ethanol solution. The mixture was heated at reflux overnight. After cooling to room temperature and filtering to remove sodium chloride, the filtrate was evaporated to dryness, yielding 5.5 parts of the fluorocarbon surfactant, $F(CF_2)_nCH_2CH_2SCH_2CH_2N^+(CH_3)_2CH_2COO^-$.

Preparation 4

A vessel was charged with 5.50 parts of methanol and 1.06 parts of 3-mercaptopropionic acid. With nitrogen atmosphere maintained over the reaction mixture to exclude air, 1.25 parts of potassium hydroxide flakes was added and the charge held at 50° to 55°C. for 1 hour with good agitation. After cooling to below 40°C., 5.26 parts of $F(CF_2)_nCH_2CH_2I$ as used in Preparation 3 was added over a one-hour period. The charge was heated to a gentle reflux at 65° to 70°C. and held at that temperature for 18 hours. After cooling to about 50°C., 10.0 parts of water was added, and the charge made acid by adding 0.3 part of HCl in the form of 30% aqueous hydrochloric acid. The charge was then allowed to separate into two layers.

The top layer contained $F(CF_2)_nCH_2CH_2SCH_2CH_2COOH$, which was mixed with 90% of its weight of 50% aqueous isopropyl alcohol solution and heated to 45° to 50°C. Sufficient lithium hydroxide monohydrate was added slowly to bring the pH to 7.5, about 0.2 part being required. Solids content was adjusted to 50% by adding water to give a 50% aqueous solution of the fluorocarbon surfactant, $F(CF_2)_nCH_2CH_2SCH_2CH_2COOLi$, where n is 4 to 14.

Preparation 5

In a suitable vessel 4.0 parts of the product $F(CF_2)_nCH_2CH_2SCH_2CH_2N(CH_3)_2$ as prepared in Preparation 3 was mixed with 2.5 parts of water and 1.5 parts of isopropyl alcohol. There was then added, slowly, 1.0 part of dimethyl sulfate with the temperature of the mass kept below 40°C. by cooling. The charge was then stirred for 12 hours at 35° to 40°C. It was then neutralized to a pH of about 8 by adding 27% ammonium hydroxide. The fluorocarbon surfactant was $F(CF_2)_nCH_2CH_2SCH_2CH_2N^+(CH_3)_3-(CH_3OSO_3^-)$.

EXAMPLE 1

The process of this invention was employed on a Champlain 36 inch Rotogravure Press capable of printing in seven colors. The printing roll had a steel base covered with 0.020 inch copper, then chrome plated. The roll employed a 150 line screen of 38 microns depth and 10 to 15 micron walls.

The ink used was an ink of this invention, a black, T-type ink employing, in amounts of 0.2% and 0.4% by total weight (2runs) the fluorocarbon surfactant of Preparation 1. The printed substrate was solid, bleached sulfate board with a clay coating.

Comparison of printing results produced according to the process of this invention employing the ink of this invention with results employing an ink without a fluorocarbon surfactant, led to the following conclusions. A slight improvement was noted when the level of fluorocarbon surfactant was raised to 0.4% from 0.2%.

Comparative results: (1) Without fluorocarbon surfactant, from 250,000 to 300,000 impressions could be made before it was necessary (because of inferior printed impressions) to rechrome the rolls. With 0.2% fluorocarbon surfactant in an ink of this invention, over 500,000 satisfactory print impressions were made. (2) Distinctly better print character was attained with the fluorocarbon surfactant-containing ink. There was much less evidence of "snowflaking" on the printed impressions. (3) The novel ink maintained the desired viscosity for a longer time in the ink fountain than did the untreated ink. (4) Fully inked impressions were conferred for a longer time with the novel fluorocarbon surfactant-containing ink and (5) Improved gloss was given to the printed matter.

EXAMPLES 2–4

The process of this invention was employed in each of these three experiments comprising the imageprinting of "Aqualox" 11 Black flexographic ink, a water based composition, product of Inter-Chemical Corp. The press used was a 6 inch Gallus-Stanford type with a 360 Anilox transfer roll. Under carefully controlled conditions prints were made in a pattern generated with a By-chrome Code-Controlled Screen. The "Aqualox" 11 Black ink was reduced to a 22 second No. 2 Zahn viscosity with water, and test prints made to establish the best conditions.

A different ink formulation was employed in each of the three experiments. The three inks were made with a fluorocarbon surfactant of Preparations 1 and 3 (of this invention) and Preparation 2 (not of this invention) at concentrations of 0.15% to 0.2%. Print quality was good, with the printed lines well defined and with little smudging when the process of this invention was employed.

EXAMPLES 5–7

Tests were performed on a gravure proofing press using a C type gravure ink diluted to a 30 second No. 2 Zahn cup viscosity with solvent containing equal parts by weight of ethyl alcohol, ethyl acetate and cellosolve. Conditions were established so that a good clear print was obtained, then prints were made with this same nonaqueous ink containing the fluorocarbon surfactants of Preparations 1,2 and 3.

The addition of 0.2% of the fluorocarbon surfactant of Preparation 1 and 0.16% of the fluorocarbon surfactant of Preparation 3 produced two inks of this invention that were found to significantly reduce the degree of pinholing (failure of printed dots to appear) when compared to an ink employing 0.14% of the fluorocarbon surfactant of Preparation 2.

EXAMPLE 8

This Example illustrates the improved utilization of pigment by an ink of this invention.

The pigment used was AAA Benzidine Yellow, a well-known material which is Pigment Yellow 12 in the Colour Index and has Colour Index No. 21090. It is prepared by diazotizing 3,3'-dichlorobenzidine and coupling to 2 mols of acetoacetanilide per mol of diazonium salt. The pigment was used in the form of an 18% solids aqueous filter cake.

For each batch, a Baker Perkins jacketed, sigma blade mixer was charged with 1,360 parts of the 18% filter cake and 600 parts of heat set vehicle prepared by mixing 360 parts of "Pentalyn" K Resin (Hercules Inc.) and 240 parts of Magie 470 oil (petroleum fraction of about 470°F. boiling point). The batch was mixed until color was transferred to the oil phase, then the water was decanted from the oil and color. Another 660 parts of filter cake was added and the process repeated until all color was in the oil phase. A third charge of 660 parts of press cake was added and the process repeated again. Finally 20 parts of oleic acid was added and mixed thoroughly with the oil and color.

At this point, the experimental condition was established. One batch of color was processed without any surfactant except the oleic acid. To a second batch, there was added 8 parts of the fluorocarbon surfactant of Preparation 1, with 10 minutes additional mixing. Each batch was then finished in exactly the same way. For each batch, the mixer was closed and residual water removed by heating at 140°F. under 25 to 28 inches of vacuum (gauge). The water was removed in about 2 hours.

The batch without fluorocarbon surfactant was then reduced by adding an additional 650 parts of the heat set vehicle (60% "Pentalyn" K resin and 40% Magie 470 oil) and another 240 parts of Magie 470 oil. This prepared ink provided a standard color, and had the composition:

24.5% pigment
62.5% vehicle
1.0% oleic acid
12.0% added Magie 470 oil

The batch containing the fluorocarbon surfactant was reduced carefully to the same strength as the standard batch, using vehicle and 470 oil in the same proportion used for the standard, 650/240. Standard strength in the ink of this invention was achieved at a composition:

22.5% pigment
63.8% vehicle
1.0% oleic acid
12.3% added Magie 470 oil
0.47% fluorocarbon surfactant Thus, the same strength was achieved with only 91.8% as much pigment in the ink of this invention, $$\frac{22.5 \times 100}{24.5}$$

The embodiments of the invention in which an exclusive property or privilege is claimed are defined as follows:

1. In a printing ink comprising a dye or pigment coloring agent, a water or organic liquid vehicle, and a surfactant, the improvement comprising incorporation therein of from 0.01% to 1.0%, based on total weight, of the surfactant $$C_nF_{2n+1} CH_2CH_2O(CH_2CH_2O)_xH$$

where $n$ has an average value of about 7 and $x$ has an average value of about 10.6.

* * * * *